(12) United States Patent
Sasaki (10) Patent No.: US 8,582,815 B2
(45) Date of Patent: Nov. 12, 2013

(54) MOVING OBJECT DETECTION APPARATUS

(75) Inventor: Mikio Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 13/397,916

(22) Filed: Feb. 16, 2012

(65) Prior Publication Data

US 2012/0213405 A1 Aug. 23, 2012

(30) Foreign Application Priority Data

Feb. 23, 2011 (JP) .................................. 2011-37225

(51) Int. Cl.
*G06K 9/00* (2006.01)

(52) U.S. Cl.
USPC .......................................... 382/103; 382/276

(58) Field of Classification Search
None
See application file for complete search history.

(56) References Cited

U.S. PATENT DOCUMENTS

| | | | |
|---|---|---|---|
| 5,748,775 A | 5/1998 | Tsuchikawa et al. | |
| 2007/0047809 A1 | 3/2007 | Sasaki | |
| 2009/0279738 A1 | 11/2009 | Sasaki | |
| 2010/0002908 A1* | 1/2010 | Miyamoto et al. | 382/103 |
| 2010/0082800 A1* | 4/2010 | Wei et al. | 709/224 |

FOREIGN PATENT DOCUMENTS

| | | |
|---|---|---|
| JP | A-2003-288600 | 10/2003 |
| JP | A-2005-123968 | 5/2005 |
| JP | A-2005-132170 | 5/2005 |
| JP | A-2007-172540 | 7/2007 |
| JP | A-2007-189704 | 7/2007 |
| JP | A-2009-143385 | 7/2009 |
| JP | A-2009-146153 | 7/2009 |
| JP | A-2012-064153 | 3/2012 |
| WO | WO 2008/015586 | * 7/2008 |

OTHER PUBLICATIONS

Abouzar, P.; Yousefi, S.; Setarehdan, S.K., "Hybrid WT Based-DCT Based Face Recognition," Signal Processing and Communications, 2007. ICSPC 2007. IEEE International Conference on , vol., No., pp. 963,966, Nov. 24-27, 2007 doi: 10.1109/ICSPC.2007.4728481. URL: http://ieeexplore.ieee.org/stamp/stamp.jsp?tp=&arnumber=4728481&isnumber=4728221.*

Mikio, S., English translation of Japanese Publication JP 2012-064153, published Mar. 29, 2012, Translation obtained by Patent Abstracts of Japan. JP 2012-064153 first cited by applicant in IDS submitted on Jun. 27, 2012.*

* cited by examiner

*Primary Examiner* — Bhavesh Mehta
*Assistant Examiner* — Tahmina Ansari
(74) *Attorney, Agent, or Firm* — Posz Law Group, PLC (57) ABSTRACT

A moving object detection apparatus generates frame difference image data each time a frame data is captured, based on the captured frame data and previous frame data, and such frame difference image data is divided into pixel blocks. Subsequently, for each of the pixel blocks a discrete cosine transformation (DCT), a two-dimensional DCT coefficient is calculated, and such two-dimensional DCT coefficients are accumulated and stored. The value of each element of the two-dimensional DCT coefficient is arranged to form a characteristic vector, and, for each of the pixel blocks at the same position of the frame difference image data, the characteristic vector is generated and then such characteristic vector is arranged to form a time-series vector. The time-series vector derived from moving-object-capturing pixel blocks is used to calculate a principal component vector and a principal component score.

6 Claims, 7 Drawing Sheets

MOVING OBJECT DETECTION APPARATUS

CROSS REFERENCE TO RELATED APPLICATION

The present application is based on and claims the benefit of priority of Japanese Patent Application No. 2011-37225, filed on Feb. 23, 2011, the disclosure of which is incorporated herein by reference.

TECHNICAL FIELD

The present disclosure generally relates to a moving object detection apparatus for detecting a moving object captured by a camera in a capture image.

BACKGROUND

Conventionally, a moving object detection apparatus is disclosed in Japanese Patent Laid-Open No. 2003-288600 (JP '600). The moving object detection apparatus of JP '600 detects a pedestrian in a camera capture image, by extracting a motion vector from a sampled capture image, by applying a parametric eigenspace method to the motion vector, and by generating a reference curve data. The reference curve data is based on a projection of the motion vector to an eigenspace while extracting a motion vector from the capture image that is considered as an object of pedestrian extraction. The apparatus of JP '600 further applies the parametric eigenspace method to the motion vector, and gets information on projection points of the motion vector to the eigenspace derived from the eigenspace method. That is, by comparing the projection points with the reference curve, the pedestrian in the capture image is detected.

Further, in another method is disclosed in Japanese Patent Laid-Open No. 2005-123968 (JP '968). The apparatus of JP '968 calculates a motion vector of a characteristic point from a capture image, and detects an approaching moving object that is approaching a subject vehicle as a group of characteristic points. The apparatus of JP '968 emphasizes an image area including such moving object in the capture image. Also, in Japanese Patent Laid-Open No. 2005-132170 (JP '170), the apparatus detects a moving object as a group of substantially same size motion vectors based on the motion vector of the characteristic point.

Further, a Harris method and a Karhunen-Loeve Transform (KLT) method are known to extract a characteristic point from the capture image. According to the KLT method, it is possible to extract a motion vector (i.e., an optical flow) of the characteristic point by tracking the extracted characteristic point.

Furthermore, as for the calculation method of the motion vector, a gradient method and a block matching method are known as well, and, as an application of these techniques, Japanese Patent Laid-Open No. 2007-172540 (JP '540) discloses a calculation of a motion vector of image pixels in an image area that correspond to a far field in the capture image based on the gradient method and a calculation of a motion vector of image pixels in an image area that correspond to a near field in the capture image.

Further, a combination of plural methods for detecting a moving object is disclosed in Japanese Patent Laid-Open No. 2009-146153 (JP '153). The method in JP '153 detects a moving object based on the motion vector calculated by the block matching method when the vehicle is not stopping, and detects a moving object based on the differential capture image of two frames.

Further, a moving object is detected by detecting a vanishing point where the moving object vanishes from the screen and by analyzing a surrounding of the vanishing point in a known technique disclosed in a Japanese Patent Laid-Open No. 2009-143385 (JP '385).

In the conventional techniques, a characteristic point and a motion vector of the far-side approaching vehicle can be detected in a strictly limited case, that is, requiring at least 5 frame intervals (i.e., more than 166 ms) to detect the motion vector of the far-side approaching vehicle. In addition, even when the motion vector is detected, it may be difficult, in many cases, to distinguish the motion vector from the background noise.

Further, since the amount of calculation for detecting the motion vector is large, implementation of such calculation by using simple (i.e., "light") software has been considered as difficult.

SUMMARY

In view of the above and other problem, the present disclosure proposes a moving object detection apparatus that extracts a moving object from a capture image without using a motion vector.

In an aspect of the present disclosure, the moving object detection apparatus, having an imaging device for capturing multiple capture images having respectively different capture times and detecting a moving object captured in the multiple capture images, includes: a differential unit for generating a differential capture image made as a difference between a base capture image and a previous capture image that is captured prior to capturing of the base capture image. Then, by using a discrete cosine transformation (DCT) coefficient calculation unit, a two-dimensional DCT coefficient is calculated by dividing the differential capture image generated by the differential unit into multiple pixel blocks having a predetermined number of pixels and by performing, for each of the multiple pixel blocks, a discrete cosine transformation. A DCT coefficient storage unit is used to accumulatively store the two-dimensional DCT coefficient each time the two-dimensional DCT coefficient is calculated by the DCT coefficient calculation unit. Then, a time-series vector generation unit, (a) generates a characteristic vector as an arrangement of elements of the two-dimensional DCT coefficients stored in the DCT coefficient storage unit and (b) generates a time-series vector for each of the pixel blocks at a same position of the differential capture image by arranging the characteristic according to a time series. The principal component analysis unit calculates a principal component score that is calculated by operating (c) the time-series vector generated by the time-series vector generation unit on (d) a principal component vector that is generated by performing a principal component analysis on a sample of the time-series vector generated in a condition that the pixel blocks capture the moving object.

The moving object detection apparatus configured in the above-described manner performs the principal component analysis of the characteristic vector that is formed as a time series arrangement of the two-dimensional DCT coefficients for each of the pixel blocks.

Further, when a moving object is captured in a capture image, an outline of the moving object appears in the differential capture image. If the outline is sufficiently sharp, an alternating component of the two-dimensional DCT coefficient calculated by performing a discrete cosine transformation on the differential capture image shows a high value.

Therefore, the two-dimensional DCT coefficient of the differential capture image is used for the detection of the moving object.

Further, the principal component vector, which is generated by performing a principal component analysis on a sample of the time-series vector acquired in a condition that the pixel blocks has the moving object captured therein, has an application of the time-series vector generated by a time-series vector generation unit, the principal component score shows a high value when the moving object is captured in the pixel blocks corresponding to the time-series vector. Therefore, based on a value of the principal component score, whether the moving object is captured in the pixel blocks is determined.

For example, by applying the time-series vector to each of the principal component vectors of an automobile, a two-wheeled vehicle and a pedestrian, the principal component score is calculated respectively for the automobile, the two-wheeled vehicle, and the pedestrian, and one of the above three objects having the highest principal component score may be determined as a captured object in the pixel blocks.

Therefore, the moving object detection apparatus described above can detect a moving object without using the motion vector.

Further, in the above configuration the moving object detection apparatus is disposed in a vehicle, and controls the imaging device to capture a front field of the vehicle. The moving object detection apparatus has a predetermined in-image horizon position for defining a position of a horizon in the capture image. The apparatus further includes an alternating component electric power calculation unit, for calculating a sum of alternating components of the two-dimensional DCT coefficient calculated by the DCT coefficient calculation unit as an alternating component electric power for each of the pixel blocks, and a first background determination unit, for determining that the pixel block is a high electric power background when the pixel block is above the predetermined in-image horizon position (i.e., an upper position) in the capture image and the alternating component electric power of the pixel block is equal to or greater than a predetermined upper high electric power determination value.

Further, the apparatus includes a second background determination unit, for determining that the pixel block is a low electric power background when the pixel block is above the predetermined in-image horizon position (i.e., an upper position) in the capture image and the alternating component electric power of the pixel block is equal to or smaller than a predetermined upper low electric power determination value, which is set to have a smaller value than the predetermined upper high electric power determination value.

Further, the apparatus includes a third background determination unit, for determining that the pixel block is the high electric power background when the pixel block is below the predetermined in-image horizon position (i.e., a lower position) in the capture image and the alternating component electric power of the pixel block is equal to or greater than a predetermined lower high electric power determination value.

Further, the apparatus includes a fourth background determination unit, for determining that the pixel block is the low electric power background when the pixel block is below the predetermined in-image horizon position (i.e., a lower position) in the capture image and the alternating component electric power of the pixel block is equal to or smaller than a predetermined lower low electric power determination value, which is set to have a smaller value than the predetermined lower high electric power determination value.

Further, the apparatus includes a candidate area setting unit, for determining, as a far-side moving object candidate area, a pixel block that is positioned around the in-vehicle horizon position in the capture image and that has not been determined by the first to fourth background determination units as one of the high electric power background and the low electric power background, and a principal component analysis prohibition unit, for prohibiting an execution of a principal component score calculation process by the principal component analysis unit for the pixel block outside of the far-side moving object candidate area set by candidate area setting unit.

Further, the in-image horizon position in the capture image mentioned above is determined by the installation position of the imaging device, the installation posture of the imaging device and the optical characteristic of the imaging device.

According to the above-described configuration, the first background determination unit determines the pixel block being positioned above the in-image horizon position and having the over-the-determination-value alternating component electric power as the high electric power background caused by a building, a telephone pole or the like. Further, the second background determination unit determines the pixel block being positioned above the in-image horizon position and having the under-the-determination-value alternating component electric power as "the low electric power background caused by the sky or the like. Further, the third background determination unit determines the pixel block being positioned below the in-image horizon position and having the over-the-determination-value alternating component electric power as the high electric power background caused by a white line of the road, gravel or the like. Further, the fourth background determination unit determines the pixel block being positioned below the in-image horizon position and having the under-the-determination-value alternating component electric power as the low electric power background caused by a road or the like.

Further, an area formed by the pixel blocks around the in-image horizon position in the capture image which have not determined as the high electric power background or the low electric power background by the first to fourth background determination unit is set as an area that may possibly include the moving object afar from a subject vehicle, which has the moving object detection apparatus, that is, the far-side moving object candidate area. In such manner, the execution of the principal component analysis for the pixel blocks outside of the far-side moving object candidate area is prevented.

In such manner, when the apparatus uses the principal component analysis for the detection of a moving object approaching from afar, the apparatus does not perform an all-pixel-block principal component analysis, performed on each and every pixel block, thereby reducing the processing load of the moving object detection apparatus.

Further, in the above configuration, the moving object detection apparatus includes a moving object determination unit, for determining whether the moving object is captured in the pixel block based on a value of the principal component score calculated by the principal component analysis unit, and a motion index calculation unit, for calculating a horizontal motion index and a vertical motion index respectively representing a horizontal motion and a vertical motion of the moving object in the pixel block based on the capture image that has undergone a determination by the moving object determination unit and a previous capture image, which is captured prior to the capture image having undergone the determination by the moving object determination unit. Further, the apparatus includes a moving object determination revision unit, which may determine that the pixel block does not have the moving object captured therein when the pixel block determined to be capturing the moving object by the moving object determination unit has the vertical motion index from the motion index calculation unit being greater than a predetermined vertical moving object determination value and the horizontal motion index from the motion index calculation unit being smaller than a predetermined horizontal moving object determination value.

In other words, when the imaging device to capture the front field of the subject vehicle captures an image during the travel of the subject vehicle, a standstill object in the capture image is detected in the image based on an idea that the standstill object hardly moves in a horizontal direction in the capture image, and moves in a vertical direction according to the travel speed of the subject vehicle.

According to the above configuration, when the standstill object in the capture image is falsely determined as the moving object based on the principal component analysis, the moving object detection apparatus can correct/revise such false determination.

Further, in the above configuration, the motion index calculation unit may designate, as a determination object pixel block, the pixel block that has been determined to be capturing the moving object by the moving object determination unit, and may select and designate a horizontal same electric power pixel block from among the pixel blocks (a) being positioned in a horizontal direction of the determination object pixel block in the previous capture image, which has been captured prior to capturing of the capture image having the determination object pixel block, and (b) having the same alternating component electric power as the determination object pixel block, and may calculate the horizontal motion index based on a distance between the determination object pixel block and the horizontal same electric power pixel block.

Further, in the above configuration, the motion index calculation unit may designate, as a vertical same electric power pixel block, the pixel block (a) being positioned in a vertical direction of the determination object pixel block in the previous capture image, which has been captured prior to capturing of the capture image having the determination object pixel block, and (b) having the same alternating component electric power as the determination object pixel block, and may calculate the vertical motion index based on a distance between the determination object pixel block and the vertical same electric power pixel block.

According to the above-described configuration, the moving object detection apparatus can easily calculate the horizontal motion index and the vertical motion index by simply searching for a pixel block in the horizontal/vertical direction of the determination object pixel block and by using the alternating component electric power of the pixel block which has already been calculated.

Further, in the above configuration, the apparatus may include a high electric power block determination unit, an outside candidate area determination unit, and a near pixel block determination unit. The high electric power block determination unit determines whether the pixel block in the capture image has the alternating component electric power higher than the predetermined high electric power determination value or not. The outside candidate area determination unit determines whether the pixel block determined to have an over-the-determination-value alternating component electric power by the high electric power block determination unit is positioned outside the far-side moving object candidate area that is set by the candidate area setting unit. The near pixel block determination unit determines whether the pixel block determined to be positioned outside the far-side moving object candidate area by the outside candidate area determination unit is a near pixel block capturing an object positioned at a short distance from the subject vehicle.

Further, the apparatus may include a horizontal motion index calculation unit and a high electric power moving object determination unit. The horizontal motion index calculation unit designates, as a high electric power near pixel block, the pixel block that is determined as the near pixel block at the short distance from the subject vehicle by the near pixel block determination unit, and for calculating the horizontal motion index for the high electric power near pixel block based on a base capture image having such high electric power near pixel block and the previous capture image captured prior to the base capture image. The high electric power moving object determination unit determines that the high electric power near pixel block captures the moving object when the horizontal motion index of the high electric power near pixel block calculated by the horizontal motion is greater than a predetermined horizontal moving object determination value.

In other words, when the alternating component electric power of the pixel block takes a high value and the capture image seems to capture the moving object, whether the capture image includes the moving object is determined based on an idea that the moving object should move in the horizontal direction in the capture image.

Further, for example, for determining whether a certain pixel block is determined as the pixel block at the short distance from the subject vehicle, the near pixel block determination unit may designate an area positioned below the in-image horizon position in the capture image as a near distance determination area, and may determine that the pixel block in such near distance determination area captures a position at the short distance from the subject vehicle.

According to the above-described configuration, the moving object detection apparatus captures not only the moving object that is approaching from afar, but also captures the moving object approaching at the short distance from the subject vehicle.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The present disclosure is described with reference to the drawings.

Figure 1:
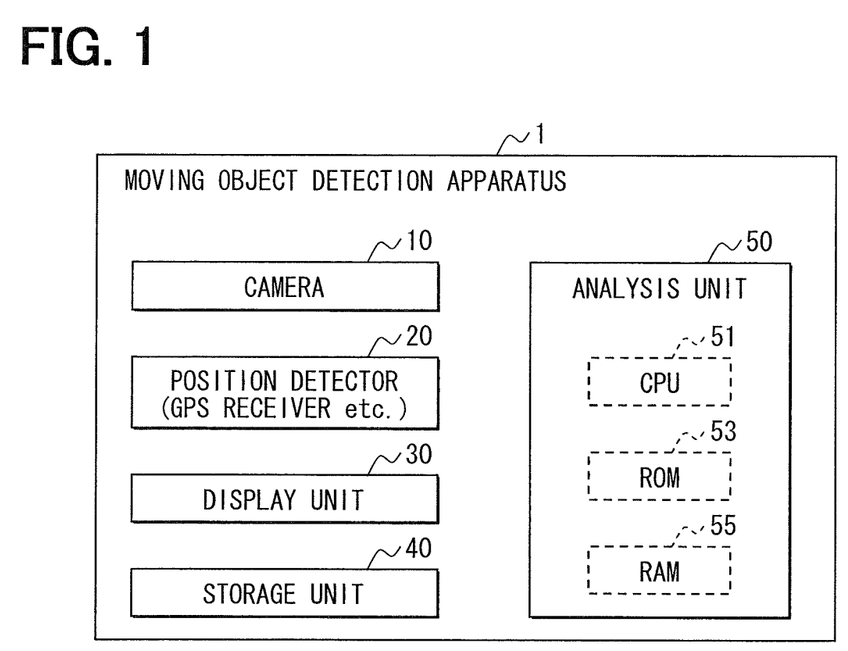
FIG. 1 is a block diagram of a moving object detection apparatus 1 an embodiment of the present disclosure.

With reference to FIG. 1, a moving object detection apparatus 1 is installed in a subject vehicle, and includes a camera 10, a position detector 20, a display unit 30, a storage unit 40, and an analysis unit 50.

The camera 10 is a wide-angle camera that can capture the front field of the vehicle in a wide angle, and the camera 10 can output motion picture data as a series of frame data (i.e., a series of standstill image data).

The position detector 20 is implemented as a combination of a receiver and a senor, such as a GPS receiver for receiving a satellite signal from the GPS satellite, a distance sensor for detecting a travel distance of the subject vehicle based on a rotation of the tire, a direction sensor, and the like. The position of the subject vehicle and a travel direction of the subject vehicle are detected based on the signals from the sensors.

Further, the display unit 30 is installed in proximity to a driver's seat in the subject vehicle, and offers various information to a driver of the subject vehicle. The display unit 30 may, for example, be implemented as a liquid crystal display device.

The storage unit 40 stores various data for the detection of a moving object from the capture image of the camera 10.

The analysis unit 50 is a device for executing various processes and for detecting the moving object in the capture image of the camera 10. The analysis unit 50 is implemented as a dedicated circuit, for example. Further, the analysis unit 50 may include a CPU 51, a ROM 53, a RAM 55, and the like, and may be realized as software for performing a process that is required for the detection of the moving object. In other words, the analysis unit 50 may be configured to realize a moving object detection function based on a process of the CPU 51 performed by a program stored in the ROM 53.

In the above-described moving object detection apparatus 1, the analysis unit 50 performs a moving object detection process to detect a moving object existing at a distant position from the subject vehicle.

Figure 2:
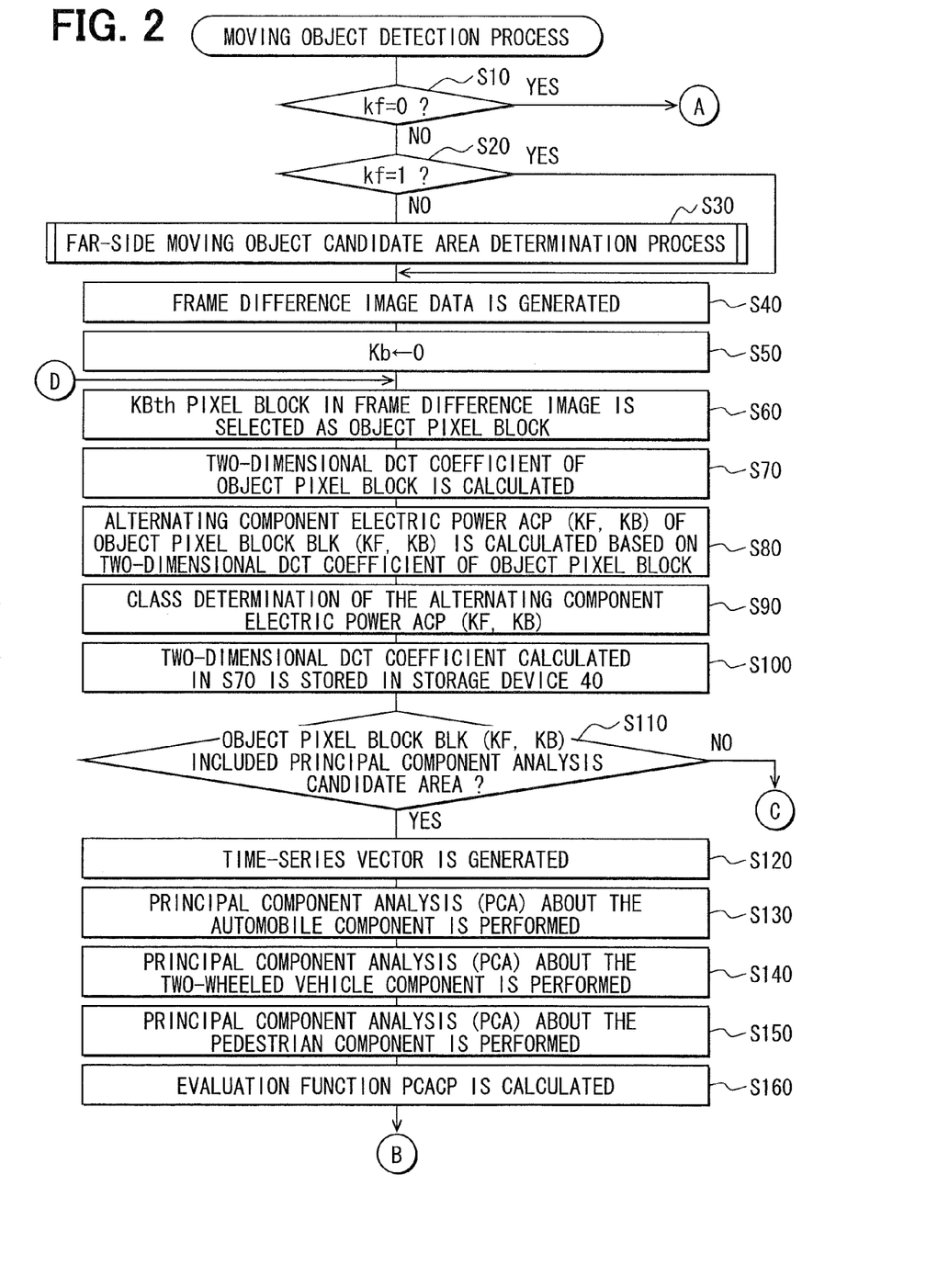
FIG. 2 is a flowchart of a former half of a moving object detection process in the embodiment of the present disclosure.
Figure 3:
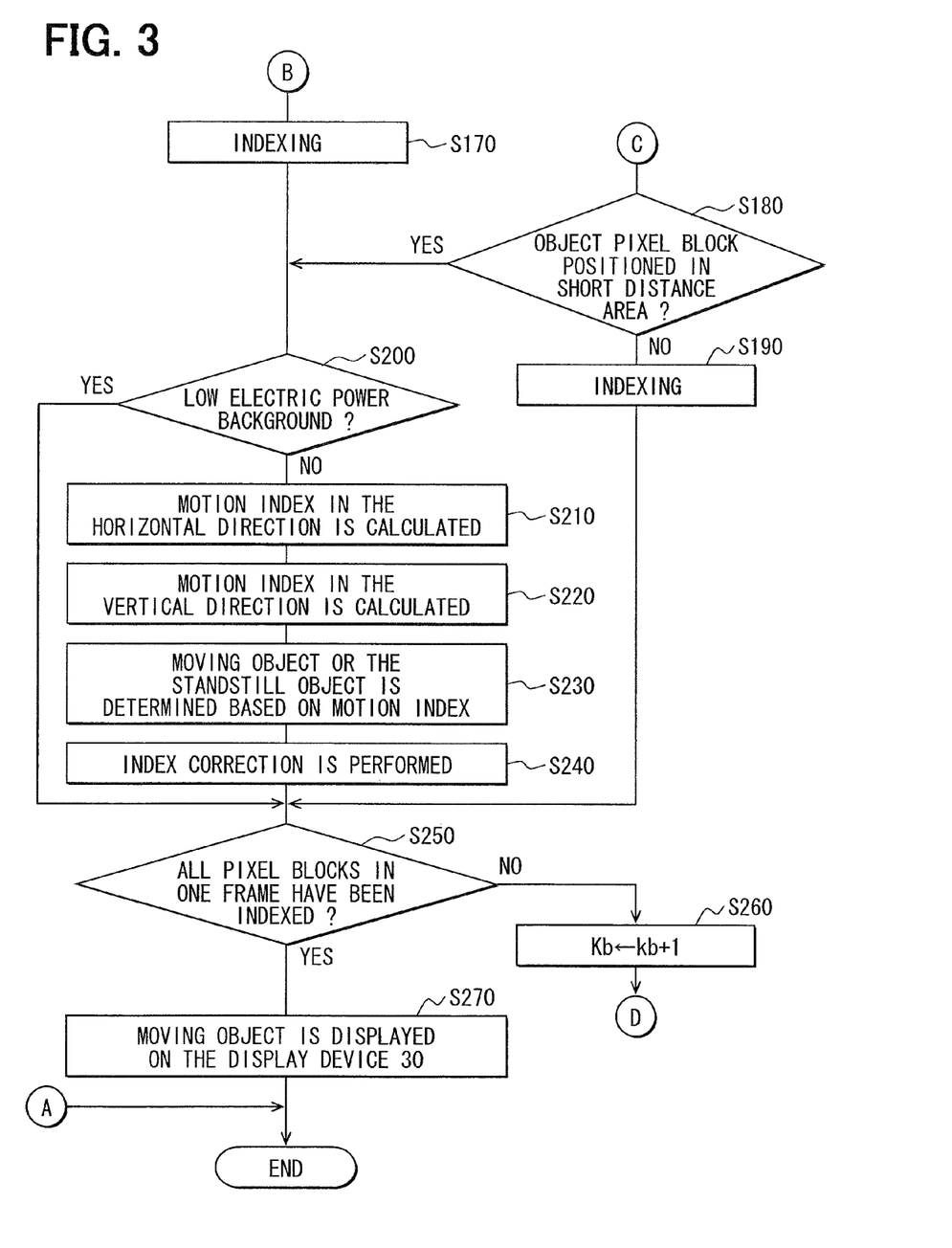
FIG. 3 is a flowchart of a latter half of the moving object detection process in the embodiment of the present disclosure.

The moving object detection process performed by the analysis unit 50 of the moving object detection apparatus 1 is described with reference to FIGS. 2 and 3. The flowcharts in FIGS. 2 and 3 are a former half and a latter half of the moving object detection process, respectively. The moving object detection process is a process that is performed every time frame data is provided to the analysis unit 50.

When the moving object detection process is performed, at first the analysis unit 50 determines in S10 whether a variable kf (i.e., a frame number variable kf hereinafter) showing a frame number of frame data, which is currently provided, is equal to 0. The frame number is a number to distinguish the frame data that is provided by the camera 10, and takes a value of 0, 1, 2, 3, ... according to a time of output. In the following, the frame data is designated as FD(kf), where the frame number kf is an integer equal to or greater than 0.

When the frame number variable kf is equal to 0 (S10: YES), the moving object detection process is finished at once. When the frame number variable kf is not equal to 0 (S10: NO), then, in S20, it is determined whether the frame number variable kf is equal to 1.

When the frame number variable kf is equal to 1 (S10: YES), the process proceeds to S40. When the frame number variable kf is not equal to 1 (S20:NO), then, in S30, a far-side moving object candidate area determination process, which is described later in detail, is performed, and the process proceeds to S40.

In S40, based on the previous frame data FD(kf−1) and the current frame data FD(kf), a frame difference image data that represents a difference of two frame images is generated. In the following, the frame difference image data representing the difference between the frame data having the frame number kf and the frame data having the frame number kf−1 is designated as a frame difference image data FDD(kf).

Then, in S50, the value of a variable representing a pixel block number is set to 0. Then, in S60, the $kb^{th}$ pixel block in the frame difference image is selected as an object pixel block for processing. In this case, the entire frame difference image is divided into K pieces of unit pixel blocks having 8×8 pixels in each unit, and the $kb^{th}$ pixel block is selected from among the K pieces of pixel blocks. In the following, the $kb^{th}$ pixel block in the frame difference image data FDD(kf) is designated as a pixel block BLK(kf, kb).

Then, in S70, by performing a two-dimensional discrete cosine transformation (DCT) on the object pixel blocks BLK (kf, kb) in the frame difference image data FDD(kf), a two-dimensional DCT coefficient of 8×8 matrix form is calculated. In the following, the value of each element of the two-dimensional DCT coefficient in the pixel block BLK(kf, kb) is represented as an arrangement Cd[kf,kb,i, j], and a direct current component of the two-dimensional DCT coefficient is represented as the value of $0^{th}$ row $0^{th}$ column element Cd[kf,kb,0,0]. In the above notation, the variables i, j respectively take an integer value from 0 to 7.

Then, in S80, based on the two-dimensional DCT coefficient of the object pixel block BLK(kf, kb), an alternating component electric power ACP(kf, kb) of the object pixel block BLK(kf, kb) is calculated according to the following equation 1.

$$ACP(kf, kb) = \sum_{m=0}^{7} \sum_{n=0}^{7} |Cd(kf, kb, m, n)| - |Cd(kf, kb, 0, 0)| \quad \text{(Equation 1)}$$

In other words, a sum of the alternating components (i.e., an absolute value) of the two-dimensional DCT coefficient in the pixel block BLK(kf, kb) is calculated as an alternating component electric power, ACP(kf, kb).

Then, in S90, a class determination for determining a magnitude of the alternating component electric power ACP(kf, kb) is performed, in which, an increase of a class number corresponds to an increase of the magnitude of the alternating component electric power ACP(kf, kb), as shown in the following.

Class 0: 100>ACP≥0
Class 1: 200>ACP≥100
Class 2: 500>ACP≥200
Class 3: 1,000>ACP≥500
Class 4: 3,000>ACP≥1000
Class 5: ACP≥3000

Figure 5:
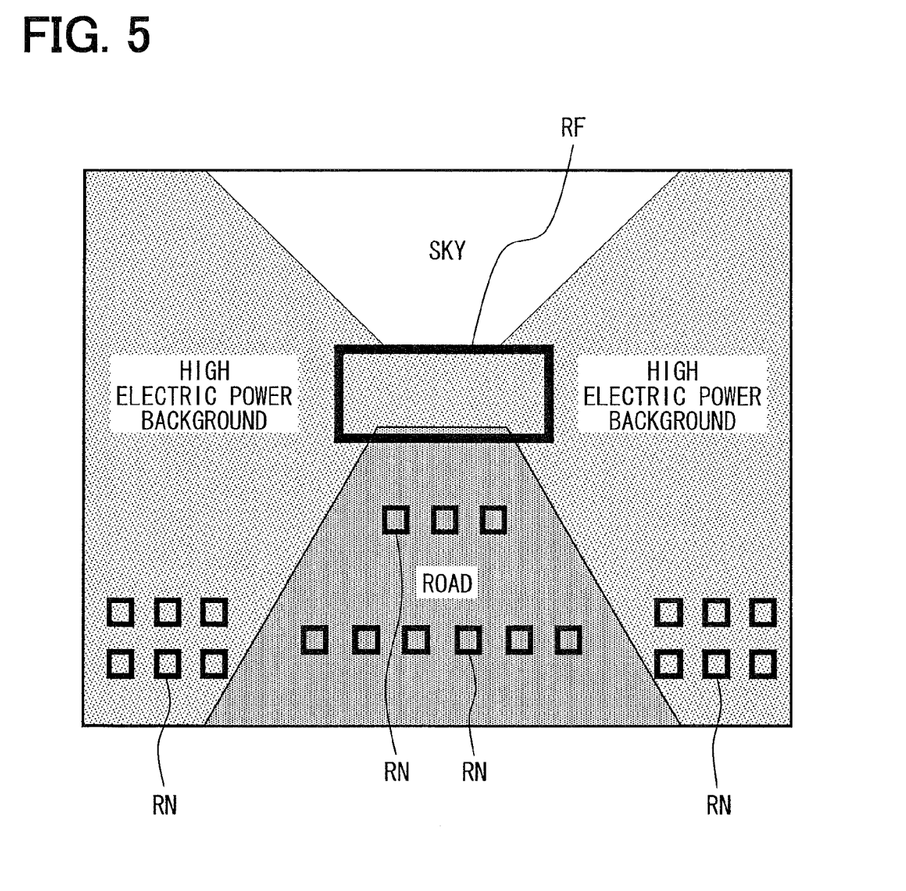
FIG. 5 is an illustration of a far-side moving object candidate area and a short/middle range monitor area in the embodiment of the present disclosure.

Further, in S100, the two-dimensional DCT coefficient calculated in S70 is stored in the storage unit 40. Then, in S110, whether the object pixel block BLK(kf, kb) is included in a principal component analysis candidate area is determined. The principal component analysis candidate area includes the far-side moving object candidate area RF determined in S30, as shown in FIG. 5 and a predetermined area RN set in front of the subject vehicle at a short distance or at a middle distance from the subject vehicle, which is designated as a short/middle distance monitor area RN in the following.

When the object pixel block BLK(kf, kb) is included in the principal component analysis candidate area (S110:YES), in S120, a time-series vector $x_{kb}$ of the $kb^{th}$ pixel block is generated by using the two-dimensional DCT coefficient stored in the storage unit 40. The time-series vector $x_{kb}$ is formed as a time-series arrangement of characteristic vectors that respectively represent the two-dimensional DCT coefficient of the $kb^{th}$ pixel block.

Now, the element values of the two-dimensional DCT coefficient in the pixel blocks are designated as $z_{n1}$, $z_{n2}$, $z_{n3}$, ..., $z_{nP}$. Here, P is the number of the pixels in one pixel block (8×8=64). Further, the element values $z_{ns}$, where s is an integer from 1 to P of the two-dimensional DCT coefficient, may also be represented by using the following equation 2, in which the element values of the two-dimensional DCT coefficient in the pixel blocks are represented in an array Cd[i, j], where variables i, j respectively take a value from 0 to 7.

$$z_{ns} = Cd[i, j], \text{ where } s = \{8 \times j + (i+j)\} \quad \text{(Equation 2)}$$

The two-dimensional DCT coefficient is basically an array with eight rows and eight columns. However, in this case, each two-dimensional DCT coefficient is replaced to have a 64-dimensional column vector.

Further, a characteristic vector $z_n$ representing the two-dimensional DCT coefficient of the $n^{th}$ pixel block, where n is an integer of 0 or more, is expressed in the following equation 3.

$$z_n = (z_{n1}, z_{n2}, z_{n3}, \ldots, z_{nP})^T \quad \text{(Equation 3)}$$

In other words, the characteristic vector $z_n$ is a replacement of the two-dimensional DCT coefficient arranged as eight rows and eight columns by a 64-dimensional column vector.

Then, by using a characteristic vector $z_{kb,kf}$ representing the two-dimensional DCT coefficient of the pixel block BLK(kf, kb), a time-series vector $x_{kb}$ of the $kb^{th}$ pixel block is represented by the following equation 4. In the equation 4, "M" is the number of frame data to constitute a time-series vector.

$$x_{kb} = (z_{kb,kf-M+1}, z_{kb,kf-M+2}, \ldots, z_{kb,kf-2}, z_{kb,kf-1}, z_{kb,kf})^T \quad \text{(Equation 4)}$$

In other words, in S120, based on M pieces of newest frame data, a time-series vector $x_{kb}$ is generated as an arrangement of the characteristic vectors (i.e., the column vectors) representing the two-dimensional DCT coefficient of the $kb^{th}$ pixel block in a time-series order and in the column direction. The value of M is predetermined, and in the present embodiment the value of M is provided as 10.

Then, in S130, the principal component analysis (PCA) about the automobile component is performed on the time-series vector $x_{kb}$ generated in S120. More practically, the time-series vector $x_{kb}$ is operated on the first to a $H^{th}$ (e.g., H=3) principal component vectors Q1, ..., QH that are stored in the storage unit 40, to calculate principal component scores f for each of the principal components. The principal component score for the $h^{th}$ principal component is designated as fh. As a result, the principal component scores fh and a summation of the scores fh, designated as PCA, for the time-series vector $x_{kb}$ is calculated in the following equation 5. The value PCA is called as an electric power evaluation value PCA hereinafter.

$$PCA = \sum_{h=1}^{H} |f_h| \quad \text{(Equation 5)}$$

Further, the principal component vectors Q1 to QH stored in the storage unit 40 are generated by collecting samples of the time-series vector generated in a condition that the automobile captured condition of the pixel blocks and by performing the principal component analysis on such samples. Therefore, the $h^{th}$ principal component vector Qh is an eigenvector based on the calculation of the eigenvalue and the eigenvector of the covariance matrix derived from the samples of $N_x$ pieces (i.e., $N_x \gg H$). The $h^{th}$ principal component vector Qh corresponds to the $h^{th}$ eigenvector having the $h^{th}$ largest eigenvalue. Since such reasoning belongs to the basics of the principal component analysis, further details are omitted from this description.

Then, in S140, similarly to S130, the principal component analysis (PCA) about a two-wheeled vehicle component is performed on the time-series vector $x_{kb}$ generated in S120, and the electric power evaluation value PCA is calculated. However, in S140, the samples of the time-series vector generated in a condition that the pixel blocks have the two-wheeled vehicle captured therein are collected, and such samples are analyzed by the principal component analysis for generating the principal component vector. Then, such principal component vector is used to perform the principal component analysis.

Furthermore, in S150, similarly to S130, the principal component analysis (PCA) about a pedestrian component is performed on the time-series vector $x_{kb}$ generated in S120, and the electric power evaluation value PCA is calculated. However, in S150, the samples of the time-series vector generated in a condition that the pixel blocks have the pedestrian captured therein are collected, and such samples are analyzed by the principal component analysis for generating the principal component vector. Then, such principal component vector is used to perform the principal component analysis.

Then, in S160, based on the electric power evaluation value PCA calculated in S130 to S150, an evaluation function PCACP is calculated for each of the automobile, the two-wheeled vehicle, and the pedestrian by using the following equations 6, 7, and 8. In the following equations, a function sign[x] takes a value of 1 when x>0, and takes a value of 0 when x=0, and takes a value of −1 when x<1. Further, a function max (a, b) takes a value of 'a' when 'a'≥'b,' and takes a value of 'b' when 'a'<'b.' The ClassACP takes a class value that is determined for the object pixel block BLK(kf, kb) in a process of S90, and is also designated as an ACP class in the following. The term α is an appropriate scaling factor.

$$ACP\_far\_move = ClassACP \times sign[max(ACP-ACPth(classFAR), 0)] \quad \text{(Equation 6)}$$

$$PCA\_far\_move = max(PCA-PCAth(classFAR), 0) \quad \text{(Equation 7)}$$

$$PCACP = \alpha \times PCA\_far\_move \times ACP\_far\_move \quad \text{(Equation 8)}$$

Further, in the present embodiment, the following conditions are set, where α=1, classFAR=2, ACPth(2)=500, PCAth(2)=15.0.

Then, in S170, based on the evaluation function PCACP calculated in S160, an indexing process of the object pixel block BLK(kf, kb) is performed, and, the process proceeds to S200. More practically, among the evaluation functions PCACP for the automobile, the two-wheeled vehicle, and the pedestrian, an index corresponding to one function having the greatest value is assigned. For example, when the evaluation function PCACP for the automobile is the greatest among the evaluation functions PCACP for the automobile, the two-wheeled vehicle, and the pedestrian, an index of '5', which indicates an automobile, is assigned to the object block BLK (kf, kb). Further, an index of the two-wheeled vehicle and an index of the pedestrian are '6' and '7', respectively. However, an index of '0', which indicates a low electric power background, is assigned to the object pixel block BLK(kf, kb), when the greatest value of the evaluation functions PCACP for the automobile, the two-wheeled vehicle, and the pedestrian is smaller than a predetermined low electric power background determination value.

Further, in S180, when the object pixel block is not included in a principal component analysis candidate area in S110 (S110:NO), it is determined whether the object pixel block BLK(kf, kb) is positioned in an area a short distance in front of the subject vehicle, and it is determined whether the object pixel block is determined as a class 4 or as a class 5 (i.e., as a high electric power background) in S90. When it is determined that the object pixel block BLK(kf, kb) is positioned a short distance from the subject vehicle and has the high electric power background (S180:YES), the process proceeds to S200. On the other hand, when it is determined that the object pixel block BLK(kf, kb) is not positioned a short distance from the subject vehicle and does not have the high electric power background (S180:NO), then, in S190, the indexing of the object pixel block BLK(kf, kb) is performed based on the class determined in S90, which may be designated as an electric power class hereinafter, and then the process proceeds to S250. More practically, when the electric power class is '0' an index '1' showing a low electric power background is assigned. When the electric power class is '1' an index '1' showing a low electric power background is assigned. When the electric power class is '2' or '3', an index '8' showing "other" is assigned. When the electric power class is '4' or '5', an index '9' showing a high electric power background is assigned.

Then, after proceeding to S200, it is determined whether the object pixel block BLK(kf, kb) has the index showing the low electric power background (i.e., the index '0' or '1') assigned thereto. When an index showing the low electric power background is assigned (S200:YES), the process proceeds to S250.

On the other hand, when an index showing a low electric power background is not assigned (S200:NO), then, in S210, a motion index in the horizontal direction (i.e., a horizontal motion index hereinafter) regarding the object pixel block BLK(kf, kb) is calculated. More practically, when a pixel block having the same alternating component electric power as the alternating component electric power ACP(kf, kb) of the object pixel block BLK(kf, kb) is found in the horizontal vicinity (e.g., within a distance of 10 pixel blocks in the horizontal direction) of the object pixel block BLK(kf−1, kb) in the previous frame, the horizontal motion index is calculated based on a distance between such pixel block in the horizontal vicinity and the object pixel block BLK(kf, kb). For example, when the alternating component electric power ACP(kf, kb) of the object pixel block BLK(kf, kb) has the same magnitude as the alternating component electric power ACP(kf−1, kb−kH) in the previous frame, the horizontal motion index is designated as kH. However, when the magnitude alternating component electric power ACP is not the same, the horizontal motion index is determined as '0.'

Then, in S220, similarly to S210, a vertical motion index indicating a motion index in the vertical direction regarding the object pixel block BLK(kf, kb) is calculated. More practically, when a pixel block having the same alternating component electric power as the alternating component electric power ACP(kf, kb) of the object pixel block BLK(kf, kb) is found in the vertical vicinity (e.g., within a distance of 10 pixel blocks in the vertical direction) of the object pixel block BLK(kf−1, kb) in the previous frame, the vertical motion index is calculated based on a distance between such pixel block in the vertical vicinity and the object pixel block BLK (kf, kb). For example, when the alternating component electric power ACP(kf, kb) of the object pixel block BLK(kf, kb) has the same magnitude as the alternating component electric power ACP(kf−1, kb−LH×kV) in the previous frame, the vertical motion index is designated as kV (i.e., LH is the number of pixel blocks in the horizontal direction: if we assume a capture image has 640×480 pixels and a pixel block has 8×8 pixels, LH is equal to 80 [=640/8]). However, when the magnitude alternating component electric power ACP is not the same, the vertical motion index is determined as '0.'

Then, in S230, based on the horizontal motion index and the vertical motion index in S210 and S220, a moving object or a standstill object is determined. More practically, when the horizontal motion index calculated in S210 is greater than a predetermined moving object determination value, it is determined that the object pixel block BLK(kf, kb) is a moving object. On the other hand, when the vertical motion index calculated in S220 is greater than '0' and the horizontal motion index calculated in S210 is smaller than the moving object determination value, it is determined that the object pixel block is a standstill object.

Then, in S240, based on a determination result in S230, index correction is performed, and the process proceeds to S250. More practically, when the object pixel block BLK(kf, kb) having the moving object index (i.e., 5, 6, 7) assigned thereto in S170 is determined as the standstill object in S230, the index '9' of the high electric power background is assigned thereto. Further, when the object pixel block BLK (kf, kb) determined as the high electric power background at the short distance in S180 is determined as the moving object in S230, the index '4' of the moving object at the short distance is assigned to the object pixel block BLK(kf, kb). In other cases, no index correction is performed.

Then, after proceeding to S250, whether all pixel blocks in one frame have been indexed is determined. In this case, when the indexing is not complete (S250:NO), then, in S260, the value of the variable kb, indicative of the pixel block number, is incremented (i.e., increased by 1), and then, the process proceeds to S60, for repeating the above described process. When the indexing is complete for all pixel blocks (S250:YES), then, in S270, a display that the pixel blocks having the moving object index (i.e., 5, 6, 7) assigned thereto represents the moving object in one frame is performed on the display unit 30, and a current cycle of the moving object detection process is finished.

Figure 4:
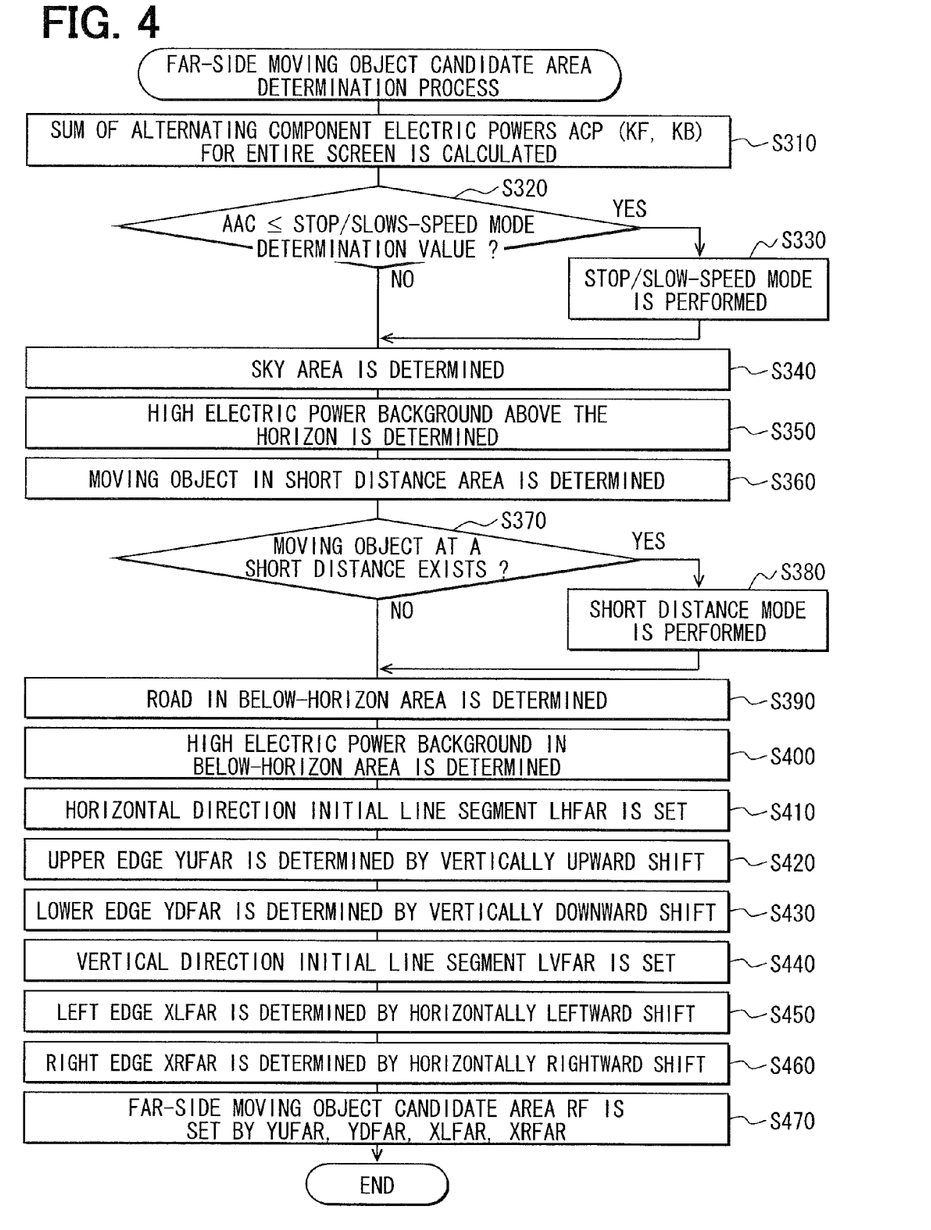
FIG. 4 is a flowchart a far-side moving object candidate area determination process in the embodiment of the present disclosure.

Now, a far-side moving object candidate area determination process performed in S30 is described with reference to FIG. 4. FIG. 4 is a flowchart of the far-side moving object candidate area determination process.

When the far-side moving object candidate area determination process is performed, at first, in S310, the analysis unit 50 calculates the summation of the alternating component electric powers ACP(kf, kb) for the entire screen based on the alternating component electric power ACP(kf, kb) calculated at a time of previous input of the frame data. Such summation of the alternating component electric powers ACP(kf, kb) is designated as an alternating component electric power sum AAC(kf) hereinafter.

Then, in S320, it is determined whether the alternating component electric power sum AAC(kf) calculated in S310 is smaller than a predetermined stop/slows-speed mode determination value AACstop. When the alternating component electric power sum AAC(kf) is smaller than the stop/slow-speed mode determination electric power value AACstop (S320:YES), then, in S330, the stop/slow-speed mode is performed, and the process proceeds to S340. The stop/slow-speed mode is a mode in which the moving object is detected when the subject vehicle is stopping or traveling. Therefore, in the stop/slow-speed mode, the moving object can be detected by the determination of the alternating component electric power only. Details of such determination is omitted from the description. On the other hand, when the alternating component electric power sum AAC(kf) is greater than the stop/slow-speed mode determination value AACstop (S320: NO), the process proceeds to S340.

Then, after proceeding to S340, a sky area is determined in the screen image generated by the previous frame data based on the alternating component electric power ACP(kf, kb), which is calculated when the previous frame data is input. More practically, when the alternating component electric power ACP(kf, kb) is smaller than a predetermined sky area determination electric power value ACPsky above the horizon (i.e., a horizon HZ in FIG. 7A) that is determined based on the installation position and/or posture of the camera and its optical characteristics, the kb$^{th}$ pixel block is determined as a "sky," and an index '0' indicating a sky, for example, is assigned to such pixel block.

Further, in S350, based on the alternating component electric power ACP(kf, kb) which is calculated when the previous frame data is input, the high electric power background above the horizon in the screen image generated by the previous frame data is determined. More practically, when the alternating component electric power ACP(kf, kb) is greater than a predetermined high electric power background determination electric power value ACPhigh above the horizon, the kb$^{th}$ pixel block is determined as the high electric power background caused by a building, telephone poles and the like, for example, and an index '9' indicating a high electric power background is assigned to such pixel block.

Then, in S360, the moving object in an area below the horizon of the screen image (i.e., in a short distance area) that is generated by the frame data is determined. More practically, the following processes, an index propagation process and a short distance moving object clustering process, are performed.

At first, in the index propagation process when the pixel block having the index of '4' indicating the short distance moving object is positioned adjacent to or close to the short/middle distance monitor area RN having the moving object index of either '5' '6' or '7' in an area below the horizon, such short distance index of the pixel block is changed to the moving object index assigned to the short/middle distance monitor area RN. In this case, the range of the adjacency and closeness is determined based on an experiment and/or experience.

Then, in the short distance moving object clustering process, the pixel block having the index of '4' '5' '6' or '7' (i.e., a moving-object indexed pixel block hereinafter) is uniformly processed without distinction, to form a cluster of the moving-object indexed pixel blocks of predetermined clustering distance range. Then, when the number of the pixel blocks in such cluster is equal to or greater than a near moving object determination value (e.g., 8 in the present embodiment), such cluster is determined to have the moving object.

Further, distinction and determination of the moving object area formed by the indexed pixel blocks as one of the automobile, the two-wheeled vehicle, or the pedestrian may be possible to a certain degree based on tracing of the gravity center movement and a new image characteristic quantity not mentioned in the present embodiment. Details of such determination is omitted from this description.

Then, in S370, based on a determination result in S360, whether a moving object at a short distance exists or not is determined. When it is determined that the moving object at the short distance exists (S370:YES), then, in S380, a short distance mode is performed, and the process proceeds to S390. The short distance mode is a mode that performs tracing of the short distance moving object and a warning operation. Details of the short distance mode is omitted from this description. On the other hand, when it is determined that the moving object at the short distance does not exist (S370: NO), the process proceeds to S390.

Then, in S390, a road in the below-horizon area of the screen image that is generated by the frame data is determined. More practically, when the alternating component electric power ACP(kf, kb) is smaller than a predetermined road determination electric power value ACPground, the kb$^{th}$ pixel block is determined as a road, and an index '1' indicating a road is, for example, assigned to the kb$^{th}$ pixel block.

Furthermore, in S400, the high electric power background in the below-horizon area (i.e., a short distance area) in the screen image generated by the frame data is determined. More practically, the alternating component electric power ACP(kf, kb) is greater than the high electric power background determination electric power value ACPhigh, the kb$^{th}$ pixel block is determined as the high electric power background caused by a white line, gravel and the like, for example, and such kb$^{th}$ pixel block has an index of '9' indicating the high electric power background assigned thereto.

Then, in the following processes in S410 to S470, an area to which no index is assigned to in the processes of S340, S350, S360, S390, or S400 is determined as an area in which a far-side moving object may be included. Such an area is designated hereinafter as a far-side moving object candidate area RF. More practically, such a far-side moving object candidate area RF is set according to the following procedure.

Figure 6A:
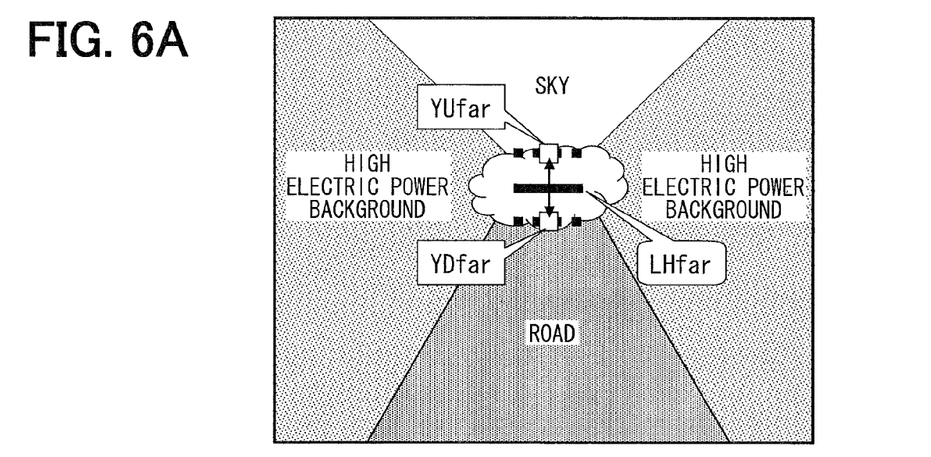
FIGS. 6A, 6B, and 6C are illustrations of a setting process of the far-side moving object candidate area in the embodiment of the present disclosure.

At first, in S410, as shown in FIG. 6A, a line segment LHfar formed by pixel blocks at a position of connection between (a) a road, which is a low electric power background below horizon, and (b) the horizon, is set, and hereinafter designated as a horizontal direction initial line segment LHfar. In this case, positions of both ends of such line segment LHfar are set in the following process. First, the length of the line segment LHfar is set to an initial value. Then, the positions of both ends of LHfar are moved in the horizontal direction by a unit of 1 pixel block so that the length of LHfar is increased. Then, for both ends of LHfar, whether the alternating component electric power ACP of the pixel block of LHfar line is greater than the high electric power background determination electric power value ACPhigh mentioned above is determined, and, when the high electric power background determination electric power value ACPhigh is exceeded, the movement of the both ends to extend the line segment LHfar is stopped, and the previous pixel blocks of such determination are used as both ends of the line segment LHfar.

Then, in S420, parallel shift of the line segment LHfar vertically toward the upper part of the screen image by a unit of 1 pixel block is performed. Every time the line segment LHfar is shifted by one pixel block, the maximum value of the alternating component electric power ACP of the pixel blocks through which the line segment LHfar passes is calculated.

When the maximum value exceeds the above-described sky area determination electric power value ACPsky or the high electric power background determination electric power value ACPhigh, the upper shift of the line segment LHfar is stopped, and a position of the line segment LHfar in the vertical direction is determined as an upper edge YUfar of the far-side moving object candidate area RF.

Then, in S430, parallel shift of the line segment LHfar vertically toward the lower part of the screen image by a unit of 1 pixel block is performed. Every time the line segment LHfar is shifted by one pixel block, the maximum value of the alternating component electric power ACP regarding the pixel blocks through which the line segment LHfar passes is calculated. When the maximum value exceeds the above-described high electric power background determination electric power value ACPhigh, the lower shift of the line segment LHfar is stopped, and a position of the line segment LHfar in the vertical direction is determined as a lower edge YDfar of the far-side moving object candidate area RF.

Figure 6B:
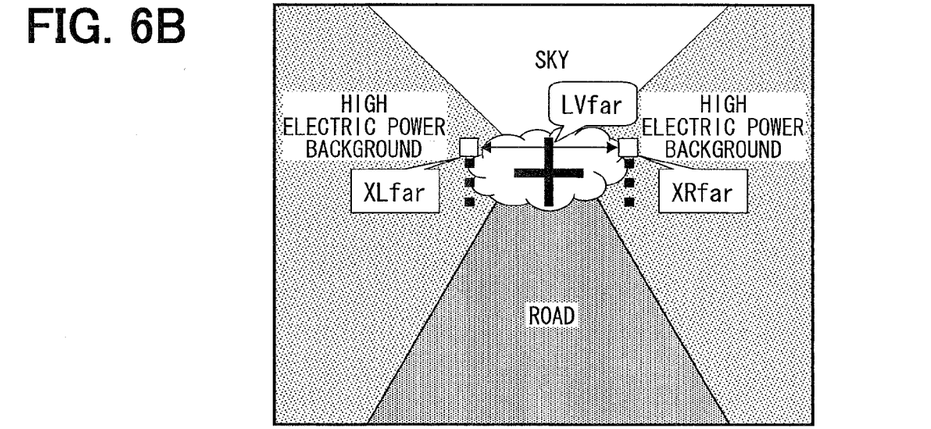

Then, in S440, as shown in FIG. 6B, a line crossing with the horizontal direction initial line segment LHfar at its center is set as a vertical direction initial line segment LVfar. In this case, positions of both ends of such line segment LVfar are set in the following process. First, the length of the line segment LVfar is set to an initial value. Then, the positions of both ends of LVfar are moved in the vertical direction by a unit of 1 pixel block so that the length of LVfar is increased. Then, for both ends of LVfar, whether the alternating component electric power ACP of the pixel block of LVfar line is greater than the high electric power background determination electric power value ACPhigh mentioned above is determined, and, when the high electric power background determination electric power value ACPhigh is exceeded, the movement of the both ends to extend the line segment LVfar is stopped, and the previous pixel blocks of such determination are used as both ends of the line segment LVfar.

Then, in S450, parallel shift of the line segment LVfar horizontally toward the left part of the screen image by a unit of 1 pixel block is performed. Every time the line segment LVfar is shifted by one pixel block, the maximum value of the alternating component electric power ACP of the pixel blocks through which the line segment LVfar passes is calculated. When the maximum value exceeds the above-described sky area determination electric power value ACPsky or the high electric power background determination electric power value ACPhigh, the horizontally-left shift of the line segment LVfar is stopped, and a position of the line segment LVfar in the horizontal direction is determined as a left edge XLfar of the far-side moving object candidate area RF.

Further, in S460, parallel shift of the line segment LVfar horizontally toward the right part of the screen image by a unit of 1 pixel block is performed. Every time the line segment LVfar is shifted by one pixel block, the maximum value of the alternating component electric power ACP of the pixel blocks through which the line segment LVfar passes is calculated. When the maximum value exceeds the above-described sky area determination electric power value ACPsky or the high electric power background determination electric power value ACPhigh, the horizontally-right shift of the line segment LVfar is stopped, and a position of the line segment LVfar in the horizontal direction is determined as a right edge XRfar of the far-side moving object candidate area RF.

Figure 6C:
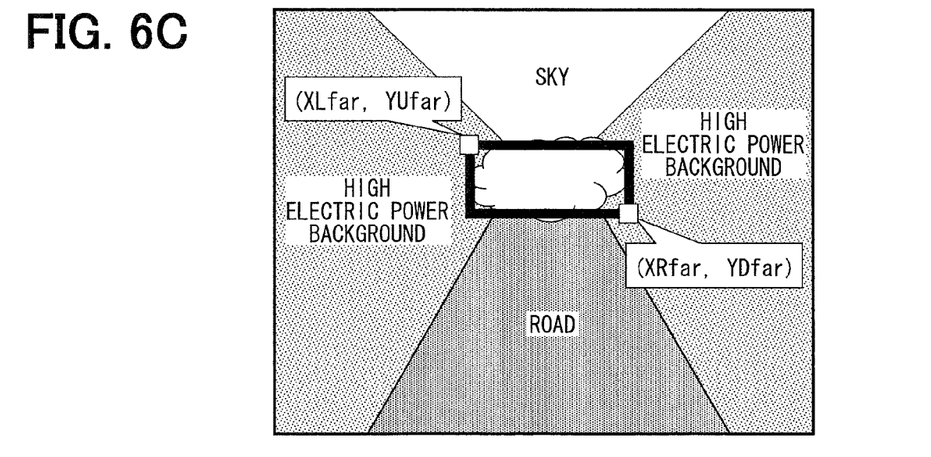

Then, as shown in FIG. 6C, in S470, a rectangular area having upper left corner coordinates (XLfar, YUfar) and lower right coordinates (XRfar, YDfar) is set as the far-side moving object candidate area RF, and the far-side moving object candidate area identification process is finished.

Figure 7A:
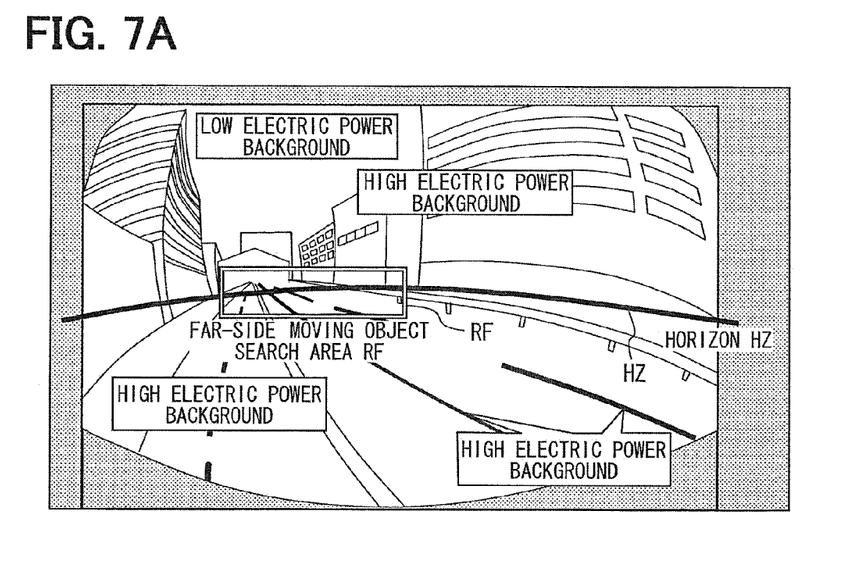
FIG. 7A is an illustration of a capture image in the embodiment of the present disclosure.
Figure 7B:
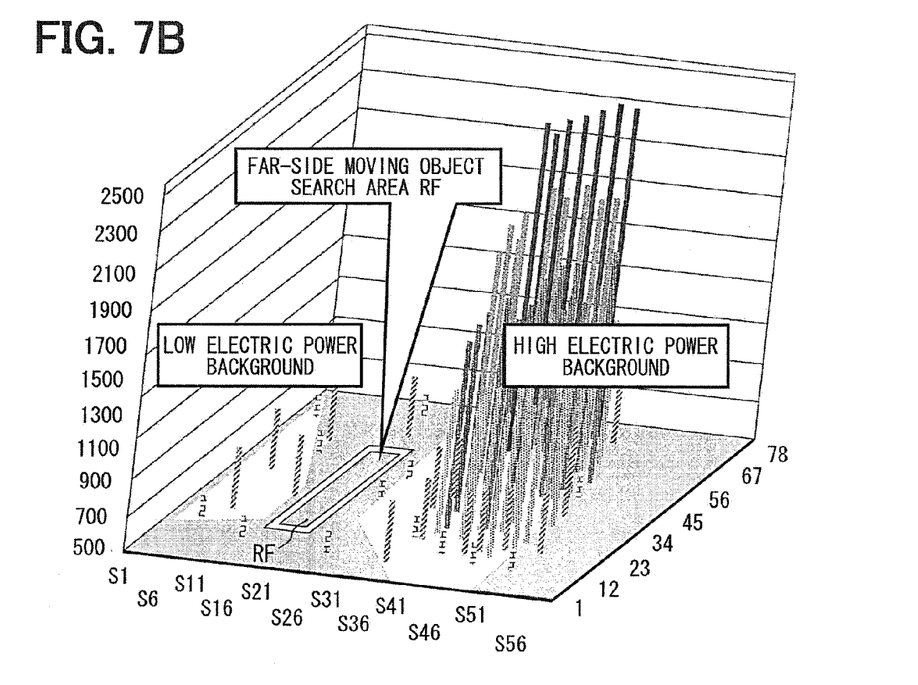
FIG. 7B is a histogram of space distribution of an alternating component electric power in the embodiment of the present disclosure.

FIG. 7A is a capture image in which a moving object approaching from a far front of the subject vehicle while the subject vehicle is traveling on a road. FIG. 7B is a histogram of spatial distribution of the alternating component electric power in the capture image shown in FIG. 7A.

As shown in FIG. 7A, a white line on the road or gravel is captured as a high electric power background below the horizon HZ, and a building is captured as a high electric power background above the horizon HZ, and a sky is captured as a low electric power background, respectively in the capture image. Further, around the horizon HZ, an area which is not the high electric power background or the low electric power background is set as a far-side moving object candidate area RF.

Further, as shown in FIG. 7B, on the right side of the histogram which corresponds to the below-horizon area, the alternating component electric power takes high values (see "a high electric power background" in FIG. 7A), and on the left side of the histogram which corresponds to the above-horizon area, the alternating component electric power takes low values (see "a low electric power background" in FIG. 7A). In between the below-horizon area (high electric power background) and the above-horizon area (low electric power background), the far-side moving object candidate area RF is set.

The moving object detection apparatus 1 having the above configuration generates a frame difference image data based on a base frame data and a previous frame data when the base frame data is acquired (S40). Then, by performing DCT on the divided pixel blocks having 8×8 pixels after dividing from the frame difference image data, an 8×8 array of two-dimensional DCT coefficients is calculated (S60, S70), and each of the two-dimensional DCT coefficients is stored in the storage unit 40 (S100). Then, a characteristic vector is formed by arranging the element values of the two-dimensional DCT coefficient in the storage unit 40, and, for each of the same position pixel block in the frame difference image data, the characteristic vectors are arranged in a time-series to generate a time-series vector $x_{kb}$ (S120). Then, the time-series vectors generated in a condition where the pixel blocks have the moving object (i.e., an automobile, a two-wheeled vehicle, a pedestrian) captured therein are sampled and analyzed by a principal component analysis, for generating a principal component vector, and such principal component vector is operated by the time-series vector $x_{kb}$ to calculate a principal component score fh for each of principal components (S130, S140, S150).

The principal component score fh takes a high value when the moving object (i.e., an automobile, a two-wheeled vehicle, a pedestrian) is captured in the pixel blocks corresponding to the time-series vector $x_{kb}$. Therefore, based on the value of the principal component score fh, whether a moving object (i.e., an automobile, a two-wheeled vehicle, a pedestrian) is captured in the pixel blocks is determined.

In the present embodiment, by operating the time-series vector $x_{kb}$ on each of the principal component vectors Q1, . . . , QH (e.g., H=3) representing an automobile, a two-wheeled vehicle, a pedestrian, respectively, the principal component score fh and the evaluation function PCACP are calculated (S160), and one of the automobile, the two-wheeled vehicle and the pedestrian having the maximum evaluation function PCACP is determined as captured in the pixel block (S170).

Therefore, the moving object in the capture image is detected by the moving object detection apparatus 1 without using a motion vector.

Further, the moving object detection apparatus 1 calculates the alternating component electric power ACP as a summation of the alternating components in the two-dimensional DCT coefficient for each of the pixel blocks (S80), and, when the above-horizon pixel block in the frame data has the alternating component electric power ACP being greater than a high electric power background determination electric power value ACPhigh, such pixel block is determined as a high electric power background (S350), and when the alternating component electric power ACP of the pixel block is smaller than a sky area determination electric power value ACPsky, such pixel block is determined as a low electric power background (S340). Further, when the alternating component electric power ACP of the below-horizon pixel block in the frame data is greater than the high electric power background determination electric power value ACPhigh, such pixel block is determined as a high electric power background (S400), and when the alternating component electric power ACP of the pixel block is smaller than a road determination electric power value ACPground, such pixel block is determined as a low electric power background (S390).

Then, an area in the frame data made up by the pixel blocks that are not determined as a high electric power background or a low electric power background in the processes of S340, S350, S390, and S400, is determined as a far-side moving object candidate area RF (S410-S470), and calculation of the principal component score fh is prohibited for the pixel blocks outside of such candidate area RF (S110).

In such manner, when the principal component analysis is used for the detection of the moving object approaching from afar of the subject vehicle, the moving object detection apparatus 1 does not perform an all-pixel-block principal component analysis, performed on each and every pixel block, thereby reducing the processing load of the moving object detection apparatus 1.

Further, based on the value of the evaluation function PCACP calculated by the principal component score fh, whether a moving object is captured in the pixel blocks is determined (S170), and, based on the frame data of pixel blocks used in such determination and the frame data of previous frame, the horizontal motion index indicating a motion index in the horizontal direction and the vertical motion index indicating a motion index in the vertical direction are calculated (S210, S220). Then, when the vertical motion index is greater than '0' and the horizontal motion index is smaller than a moving object determination value, it is determined that no moving object is captured in the pixel block (S230).

In other words, when the camera 10 which is installed to capture a front field of the subject vehicle captures an image during the travel of the subject vehicle, the standstill object in the frame data hardly moves in the horizontal direction, and the standstill object moves vertically in the frame data according to the travel speed of the subject vehicle. The determination of the standstill object is based on such idea.

In such manner, when the standstill object in the frame data is falsely determined as the moving object by the principal component analysis, such a false determination is corrected.

Further, when a pixel block having the same alternating component electric power as the alternating component electric power ACP(kf, kb) of the object pixel block BLK(kf, kb) is found in the horizontal vicinity of the object pixel block BLK(kf−1, kb) in the previous frame, the horizontal motion index is calculated based on a distance between such pixel block in the horizontal vicinity and the object pixel block BLK(kf, kb) (S210).

Furthermore, when a pixel block having the same alternating component electric power as the alternating component electric power ACP(kf, kb) of the object pixel block BLK(kf, kb) is found in the vertical vicinity of the object pixel block BLK(kf−1, kb) in the previous frame, the vertical motion index is calculated based on a distance between such pixel block in the vertical vicinity and the object pixel block BLK(kf, kb) (S220).

In such manner, based on the value of the alternating component electric power of the pixel block, which is already calculated, and by using a simple method of searching only for a pixel block positioned in the horizontal or vertical direction of the object pixel block BLK(kf, kb), the horizontal/vertical motion index is easily calculated.

Further, it is determined whether the alternating component electric power ACP of the pixel block in the frame data is greater than a value (i.e., 1000), which is used to determine the class 4 or the class 5 (i.e., a high electric power background) (S90), and then, it is determined whether the pixel block is positioned outside the far-side moving object candidate area RF (S110). Then, whether the pixel block determined to be outside of the far-side moving object candidate area RF is a pixel block that captures an object at a short distance position from the subject vehicle is determined (S180), and the horizontal motion index is calculated for the pixel block that is determined as a high electric power background at the short distance (S200, S210), and, when the horizontal motion index is greater than the moving object determination value, it is determined that a moving object is captured in the pixel block (S230).

In other words, when the alternating component electric power ACP of the pixel block takes a high value and the capture image seems to capture the moving object, whether the capture image includes the moving object is determined based on an idea that the moving object should move in the horizontal direction in the frame data.

In such manner, the moving object detection apparatus 1 captures not only the moving object that is approaching from afar, but also captures the moving object approaching at the short distance from the subject vehicle.

In the above described embodiment, the camera 10 is an imaging device in the present disclosure, the process in S40 is a differential unit in the present disclosure, the process in S60 and S70 is a DCT coefficient calculation unit in the present disclosure, the process in S100 is a DCT coefficient storage unit in the present disclosure, the process in S120 is a time-series vector generation unit in the present disclosure, the process in S130 to S150, as for a principal component analysis unit in the present disclosure, the frame data is the capture image in the present disclosure, the frame difference image data is a differential capture images in the present disclosure.

Further, the process in S80 is an alternating component electric power calculation unit in the present disclosure, the process in S350 is a first background determination unit in the present disclosure, the process in S340 is a second background determination unit in the present disclosure, the process in S400 is a third background determination unit in the present disclosure, the process of S390 is a fourth background determination unit in the present disclosure, the process in S410 to S470 is a candidate area setting unit in the present disclosure, the process in S110 is a principal component analysis prohibition unit in the present disclosure, the high electric power background determination electric power value ACPhigh is an upper high electric power determination value in the present disclosure, the sky area determination electric power value ACPsky is an upper low electric power determination value in the present disclosure, the high electric power background determination electric power value ACPhigh is a lower high electric power determination value in the present disclosure, the road determination electric power value ACPground is a lower low electric power determination value in the present disclosure.

Further, S160 and S170 are a moving object determination unit in the present disclosure, S210 and S220 are a motion index calculation unit in the present disclosure, S230 and S240 are a moving object determination revision unit in the present disclosure, the determination value '0' used with the vertical motion index in the process of S230 is a vertical moving object determination value in the present disclosure, the moving object determination value is a horizontal moving object determination value in the present disclosure.

Further, the process in S90 is a high electric power block determination unit in the present disclosure, the process in S110 is an outside candidate area determination unit in the present disclosure, the process in S180 is a near pixel block determination unit, the process in S200 and S210 is a horizontal motion index calculation unit in the present disclosure, the process in S230 is a high electric power moving object determination unit in the present disclosure, the ACP value determined as a class 4 or above in the process of S90 (i.e., the value of 1000) is a high electric power determination value in the present disclosure.

Although the present disclosure has been fully described in connection with preferred embodiment thereof with reference to the accompanying drawings, it is to be noted that various changes and modifications will become apparent to those skilled in the art.

For example, in the above embodiment, the evaluation function PCACP is a multiplication type as shown in the equation 8. However, it may be a weighting addition type as shown in the following equation 9.

$$PCACP = w1 \times PCA\_far\_move + w2 \times ACP\_far\_move \quad \text{(Equation 9)}$$

Further, w1 in the equation 9 is a weight coefficient of the electric power evaluation value PCA side, w2 is a weight coefficient of the ACP class side.

Further, in the above embodiment, the far-side moving object candidate area RF is set around the horizon HZ. However, when the subject vehicle enters vertically into a road on which a moving object may exist, the moving object may possibly approach from both of right and left sides. Therefore, the far-side moving object candidate area RF in the capture image may be set at an area corresponding to both of the right and left sides of the subject vehicle. Further, whether the far-side moving object candidate area RF is set on both of the right and left sides may be determined, for example, based on information stored in a navigation apparatus.

Further, the alternating component electric power takes a small value for the far-side pixel blocks in the spatial distribution, unless that the camera 10 in the subject vehicle has a drastic move such as panning caused by the movement of the subject vehicle. Therefore, plural far-side moving object candidate areas RF may roughly set at or around a "valley" portion in the spatial distribution, where the road area (i.e., the low electric power background below horizon) and the sky (i.e., the low electric power background above horizon) are transitionally connected.

Further, for the reduction of calculation of the principal component analysis about the pixel blocks in the far-side moving object candidate area RF, samples of the pixel block to have the principal component analysis may be selected based on the size, the number, or the shape of the far-side moving object candidate area RF. Further, a pattern of sampling may be changed (e.g., a checker pattern or the like may be used as a sampling pattern).

Such changes, modifications, and summarized scheme are to be understood as being within the scope of the present disclosure as defined by appended claims.

What is claimed is:

1. A moving object detection apparatus (i) having an imaging device for capturing multiple capture images having respectively different capture times and (ii) detecting a moving object captured in the multiple capture images, the apparatus comprising:
    a differential unit for generating a differential capture image that is generated as a difference between a base capture image and a previous capture image that is captured prior to capturing of the base capture image;
    a DCT coefficient calculation unit for calculating a two-dimensional discrete cosine transformation (DCT) coefficient by dividing the differential capture image generated by the differential unit into multiple pixel blocks having a predetermined number of pixels and by performing for each of the multiple pixel blocks a discrete cosine transformation (DCT);
    a DCT coefficient storage unit for accumulatively storing the two-dimensional DCT coefficient each time the two-dimensional DCT coefficient is calculated by the DCT coefficient calculation unit;
    a time-series vector generation unit (a) for generating a characteristic vector by arranging elements of the two-dimensional DCT coefficient stored in the DCT coefficient storage unit and (b) for generating a time-series vector for each of the pixel blocks at a same position of the differential capture image by arranging the characteristic vectors according to a time series; and
    a principal component analysis unit for calculating a principal component score that is calculated by operating (c) the time-series vector generated by the time-series vector generation unit on (d) a principal component vector that is generated by a principal component analysis on a sample of the time-series vector generated in a condition that the pixel blocks capture the moving object.

2. The moving object detection apparatus of claim 1, wherein the apparatus is disposed in a vehicle, and the imaging device captures a front field of the vehicle and sets a predetermined in-image horizon position for defining a position of a horizon in the capture image, the apparatus further comprising:
    an alternating component electric power calculation unit for calculating a sum of alternating components of the two-dimensional DCT coefficient calculated by the DCT coefficient calculation unit as an alternating component electric power for each of the pixel blocks;
    a first background determination unit for determining that the pixel block is a high electric power background when the pixel block is above the predetermined in-image horizon position in the capture image and the alternating component electric power of the pixel block is equal to or greater than a predetermined upper high electric power determination value;
    a second background determination unit for determining that the pixel block is a low electric power background when the pixel block is above the predetermined in-image horizon position in the capture image and the alternating component electric power of the pixel block is equal to or smaller than a predetermined upper low electric power determination value, which is set to have a smaller value than the predetermined upper high electric power determination value;
    a third background determination unit for determining that the pixel block is the high electric power background when the pixel block is below the predetermined in-image horizon position in the capture image and the alternating component electric power of the pixel block is equal to or greater than a predetermined lower high electric power determination value;

a fourth background determination unit for determining that the pixel block is the low electric power background when the pixel block is below the predetermined in-image horizon position in the capture image and the alternating component electric power of the pixel block is equal to or smaller than a predetermined lower low electric power determination value, which is set to have a smaller value than the predetermined lower high electric power determination value;

a candidate area setting unit for determining, as a far-side moving object candidate area, a pixel block that is positioned around the in-vehicle horizon position in the capture image and that has not been determined by the first to fourth background determination units as one of the high electric power background and the low electric power background; and a principal component analysis prohibition unit, for prohibiting an execution of a principal component score calculation process by the principal component analysis unit for the pixel block outside of the far-side moving object candidate area set by candidate area setting unit.

3. The moving object detection apparatus of claim 1 further comprising:

a moving object determination unit for determining whether the moving object is captured in the pixel block based on a value of the principal component score calculated by the principal component analysis unit;

a motion index calculation unit for calculating a horizontal motion index and a vertical motion index respectively representing a horizontal motion and a vertical motion of the moving object in the pixel block based on (i) the capture image that has undergone a determination by the moving object determination unit and (ii) a previous capture image that is captured prior to the capture image having undergone the determination by the moving object determination unit; and a moving object determination revision unit for determining that the pixel block does not have the moving object captured therein when the pixel block determined to be capturing the moving object by the moving object determination unit has the vertical motion index calculated by the motion index calculation unit being greater than a predetermined vertical moving object determination value and the horizontal motion index calculated by the motion index calculation unit being smaller than a predetermined horizontal moving object determination value.

4. The moving object detection apparatus of claim 3, wherein the motion index calculation unit designates, as a determination object pixel block, the pixel block that has been determined to be capturing the moving object by the moving object determination unit, the motion index calculation unit selects and designates a horizontal same electric power pixel block from among the pixel blocks (a) being positioned in a horizontal direction of the determination object pixel block in the previous capture image that has been captured prior to capturing of the capture image having the determination object pixel block, and (b) having the same alternating component electric power as the determination object pixel block, and the motion index calculation unit calculates the horizontal motion index based on a distance between the determination object pixel block and the horizontal same electric power pixel block.

5. The moving object detection apparatus of claim 3, wherein the motion index calculation unit designates, as a determination object pixel block, the pixel block that has been determined to be capturing the moving object by the moving object determination unit, the motion index calculation unit selects and designates a vertical same electric power pixel block from among the pixel blocks (a) being positioned in a vertical direction of the determination object pixel block in the previous capture image that has been captured prior to capturing of the capture image having the determination object pixel block, and (b) having the same alternating component electric power as the determination object pixel block, and the motion index calculation unit calculates the vertical motion index based on a distance between the determination object pixel block and the vertical same electric power pixel block.

6. The moving object detection apparatus of claim 2 further comprising:

a high electric power block determination unit for determining whether the pixel block in the capture image has the alternating component electric power higher than a predetermined high electric power determination value or not;

an outside candidate area determination unit for determining whether the pixel block determined to have an over-the-determination-value alternating component electric power by the high electric power block determination unit is positioned outside the far-side moving object candidate area that is set by the candidate area setting unit;

a near pixel block determination unit for determining whether the pixel block determined to be positioned outside the far-side moving object candidate area by the outside candidate area determination unit is a near pixel block capturing an object positioned at a short distance from the subject vehicle;

a horizontal motion index calculation unit for designating, as a high electric power near pixel block, the pixel block that is determined as the near pixel block at the short distance from the subject vehicle by the near pixel block determination unit, and for calculating the horizontal motion index for the high electric power near pixel block based on a base capture image having the high electric power near pixel block and the previous capture image captured prior to the base capture image; and a high electric power moving object determination unit for determining that the high electric power near pixel block captures the moving object when the horizontal motion index of the high electric power near pixel block calculated by the horizontal motion index calculation unit is greater than a predetermined horizontal moving object determination value.

* * * * *